(12) United States Patent
Bendahan et al.

(10) Patent No.: US 10,447,748 B2
(45) Date of Patent: Oct. 15, 2019

(54) SHARING MEDIA INFORMATION BETWEEN APPLICATIONS ON CLIENT DEVICES

(71) Applicant: Apple Inc., Cupertino, CA (US)

(72) Inventors: Aurie Bendahan, San Jose, CA (US); Edward T. Schmidt, Burlingame, CA (US); Nicholas J. Paulson, San Francisco, CA (US); Jason P. Ketterman, San Jose, CA (US); Charles Magahern, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 15/153,641

(22) Filed: May 12, 2016

(65) Prior Publication Data

US 2017/0331869 A1  Nov. 16, 2017

(51) Int. Cl.
 *G06F 15/16* (2006.01)
 *H04L 29/06* (2006.01)
 *H04L 29/08* (2006.01)

(52) U.S. Cl.
 CPC .......... *H04L 65/60* (2013.01); *H04L 65/4084* (2013.01); *H04L 67/10* (2013.01)

(58) Field of Classification Search
 CPC .................................. H04L 65/60; H04L 67/10
 See application file for complete search history.

(56) References Cited

U.S. PATENT DOCUMENTS

| | | | | |
|---|---|---|---|---|
| 6,721,489 B1 * | 4/2004 | Benyamin | ................. | G06F 8/65 386/234 |
| 6,933,433 B1 * | 8/2005 | Porteus | ............ | G06F 17/30017 707/E17.009 |
| 8,473,993 B2 * | 6/2013 | Athias | ................ | H04N 7/17318 725/105 |
| 8,612,442 B2 * | 12/2013 | Bilinski | ............ | G06F 17/30772 707/736 |
| 8,892,691 B2 | 11/2014 | Pantos et al. | | |
| 9,773,057 B2 * | 9/2017 | Bilinski | ............ | G06F 17/30761 |

(Continued)

OTHER PUBLICATIONS

Leechbite Apps, "iTunes is the world's easiest way to organize and add to your digital media collection." iTunes Preview, LeechTunes on the App Store. Dec. 17, 2015. 3 pages.

*Primary Examiner* — June Y Sison
*Assistant Examiner* — Dixon F Dabipi
(74) *Attorney, Agent, or Firm* — Kilpatrick Townsend & Stockton LLP

(57) ABSTRACT

A media process may receive, from a client application, a request for media information about a range of media items in a queue of a media application, the request being sent while the media application is executing. The queue includes a previous set of media items that have been played by the media application, a current item (e.g., currently playing), and a future set of items that are to be played The request may specify the range to include the current item and at least one item from the previous set and/or future set. The daemon sends a request to the media application and receives media information from the application. The received media information may include an order of media items and an identifier for each item in the range of items. The received information may be sent to the client application for displaying information about the range of items.

25 Claims, 9 Drawing Sheets

(56) References Cited

U.S. PATENT DOCUMENTS

| | | | |
|---|---|---|---|
| 2003/0033321 A1* | 2/2003 | Schrempp | H04H 20/14 |
| 2004/0086120 A1* | 5/2004 | Akins, III | G11B 27/034 |
| | | | 380/240 |
| 2006/0080408 A1 | 4/2006 | Istvan et al. | |
| 2008/0005348 A1* | 1/2008 | Kosiba | H04L 29/06027 |
| | | | 709/231 |
| 2009/0106639 A1* | 4/2009 | Blinnikka | G06F 17/30053 |
| | | | 715/200 |
| 2009/0217329 A1* | 8/2009 | Riedl | H04N 7/17318 |
| | | | 725/93 |
| 2011/0252118 A1* | 10/2011 | Pantos | G06F 17/30053 |
| | | | 709/219 |
| 2013/0304777 A1 | 11/2013 | Bilinkski et al. | |
| 2014/0108929 A1* | 4/2014 | Garmark | H04L 65/60 |
| | | | 715/716 |

\* cited by examiner

SHARING MEDIA INFORMATION BETWEEN APPLICATIONS ON CLIENT DEVICES

FIELD

Embodiments relate generally to managing communication and display of media item information between clients, including, but not limited to sharing playlist information for music and video items across applications and between devices, such as smartphones and wearable devices.

BACKGROUND

Devices can have first-party (or native) device software (e.g., an operating system for the device and applications developed by or at the direction of the same entity that developed the operating system) and third-party software that includes applications developed separately from the first-party (or native) device software. Third-party applications are sometimes loaded on a device to provide additional functionality to the device. Native software and third-party applications can include media applications.

There is an ever expanding number of different types of networked devices running native and third-party applications that seek to access information from other applications or devices. Providing information from an application on a device to different custom and/or application-specific user interfaces of different applications and devices can be cumbersome and inefficient.

SUMMARY

Methods for obtaining information about a range of media items from a media application and sharing that information across client applications are provided. Examples of client applications include a lock screen, an operating system control center, or a proxy application for a wearable device. In some embodiments, a portion of a media item playlist or playback queue can be provided from a media application to one or more client applications executing on a mobile device. For example, the media application can include a music or video player application executing on a smartphone or the like. Also, for example, client applications can include a lock screen of a phone, a control center display of a mobile device, a user interface screen of a car, or the watch face of a smartwatch.

According to some embodiments, a media process (e.g., a media daemon) can receive a request for media information about a range of media items in a playback queue of a media application. The request is received from a client application on a device and is sent from the client application while the media application is executing. The media application can be executing on the device that is running the client application or another device. The queue can include a previous set of media items that have been played by the media application, a current media item (e.g., a "now playing" song or video), and a future set of media items that are to be played. The request from the client application can specify that the range is to include the current media item and at least one media item from the previous set and/or the future set. A request is sent from the media process to the media application, and in response, at least a portion of media information is received at the media process from the media application. The received media information includes an order of media items and an identifier for each media item in the range of media items. The order indicates an order in the queue of the media application. The identifier can uniquely identify each media item (e.g., a unique identifier for a song or video). The received media information can also include metadata about each media item. Identifiers can be correlated to metadata for each media item. The received media information is then sent to the client application for displaying information about the range of media items.

According to embodiments, media information can be sent from a media application to one or more client applications via a media daemon. The media daemon responds to requests from client devices and applications for information pertaining to a range of media items. In certain embodiments, the range can be a numerical range of items in a playlist (e.g., −5 to 5, where negative numbers indicate previously played items and positive numbers indicate a future item to be played). Instead of responding with just a "now playing" media item and its metadata (e.g., title, artist), the media daemon can send a request to the media application to obtain metadata for the full range of media items. The media application provides the metadata for the requested range, or at least a portion of the metadata that is to be sent over in stages. For example, in cases where data for a requested range of media items is too large to be sent together (e.g., artwork for music items), the data can be sent in stages. The media daemon can then send the metadata to the one or more clients so they can display information about the previously played and/or future media items that are queued to be played.

Other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
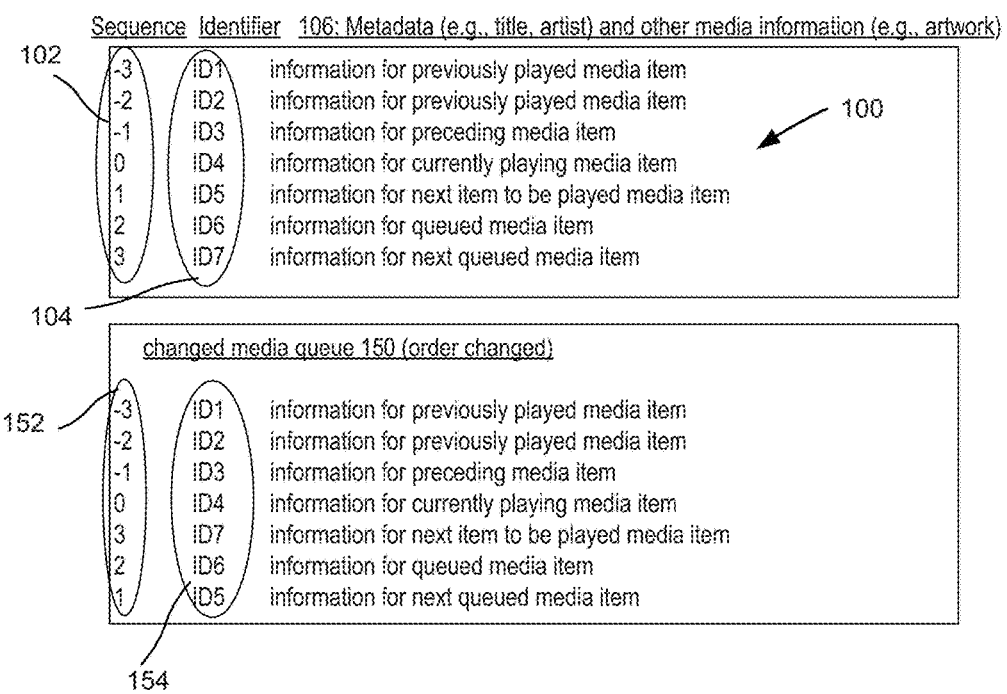
FIG. 1 depicts an example media queue with media information for items in the queue.

Currently, a media application can broadcast a "now playing" item to a media daemon, which stores the "now playing" item. Client applications and devices (e.g., a lock screen, a control center of an operating system, a smartphone, a car, a smartwatch, etc.) send a request to the media daemon to obtain the "now playing" information to display. As a result, current techniques can provide information for a media item currently being accessed in a media application, but not other media items that have already been accessed or are queued to be accessed in the media application. Thus, a user of client applications and devices has no way of easily seeing information about media items that have previously played or will play in the future.

Sharing "now playing" information for a currently played audio or video file across multiple clients can require providing the information to custom and/or application-specific user interfaces of different applications and devices. Additionally, media items often have metadata associated with them, such as titles, artist names, genres, and other information such as graphics (e.g., icons or album artwork). Providing such metadata and other information for a range of media items beyond a currently played audio or video file across multiple devices and applications can take additional time.

Accordingly, there is a need for providing media information for a range of media items to different networked client devices. Methods provide media information for a range of media items to different clients running native and third-party applications. According to some embodiments, information for a range of media items (e.g., audio or video files) is provided to different custom and/or application-specific user interfaces of different client applications and devices. Embodiments improve existing techniques by using a media daemon to obtain media information for a requested range of media items from a media application, thereby allowing various media information to be requested and obtained from the media application.

Embodiments described herein relate to providing media information from a media application (also called a media app), such as a music player application, to client applications running on a same device or other devices. The media information can include information for a media item that is currently being accessed in the media application, in addition to other media items in a queue or playlist. The media information can be provided in response to a request from a client, where the request specifies a range of media items including a current media item and at least one media item from a previous set of items already played in the media application and/or a future set of items that are queued to be played in the media application. The current media item can be a currently playing item, a paused item, or an item designated to be playing if the media player is in a playing state. The process of providing the media information can include determinations of what changed information is needed, and what information is already available to the client. The determinations can be made to avoid sending redundant media information to a client by only sending the client information for media items that have changed. In one example, a media daemon can determine that a sequence of a playlist has changed, but that the content of the list and the media items within it are unchanged. According to this example, the process just reorders an existing list of media items displayed at the client instead of re-sending data for items in the list. Advantages of such determinations include reducing the amount of data sent to a client and reducing frustration of a user.

The media information can include a unique identifier for each item in a queue or playlist, including an identifier for a current media item (e.g., a "now playing" song) in addition to identifiers for items in the previous set and/or the future set. The information provided to the client can also include metadata associated with the media items, such as titles, artist names, genres, and other information such as graphics (e.g., icons or album artwork). The media information may be provided via a media daemon that communicates with the media application. The daemon can provide the media information to multiple client devices and applications in response to requests from the clients that are received at the media daemon.

The media application can send a notification to client applications of the media daemon when an order of a media queue changes, e.g., when the currently playing song ends or a playlist sequence changes. If a notification is sent to a client application, the sending can be via the media daemon. In certain embodiments, the media daemon can avoid sending redundant information to a client. For instance, the daemon may only send a client app information for a media item that changes instead of information for an entire list of media items. Similarly, if an order of items to be played in an existing list changes, the logic can reorder the list of media items displayed at the client instead of re-sending data for the entire list. The order of items to be played can change as a result of shifting a media item up in a queue to play earlier. In addition to an order of a media queue changing, metadata for media items in the queue can change. For example, album artwork or other graphics for an item in the queue can change, and such a change in an item in a queue can cause the media application to send a notification to client applications of the media daemon.

As the media information can be provided by a media application in response to request(s) from client application(s), the provided media information can be tailored to the specific request. Accordingly, there may not be a predetermined set of data that a media app publishes to all client applications. While there can be a limited number of songs or videos in a playlist, a client application may not want to preemptively upload data about all the items that are in a playback queue. Instead, a client application that displays media information can ask for a specific set of media information that it needs. For example, a client application might send a request for information on the next five songs or ten songs that will be played in a playlist.

I. Media Information

Media information refers to information related to media items (e.g., audio or video files) that can be played using a media application such as a music or video player application. Media information includes the media item itself, metadata associated with a media item, and other information related to the media item such as artwork.

An example of a media item queue is provided in FIG. 1. As shown in FIG. 1, a media queue 100 can include a sequence number 102 of media items, unique identifiers 104 for each of the items, and metadata 106. A media queue or playlist can include a finite set of media items. The media queue 100 includes −/+N items, where −N represents a number of previously played items and +N represents a number of items to be played in the future. In the example of FIG. 1, N=3, and media queue 100 includes three previously played items, a current item (e.g., one currently playing), and the next three items to be played. The numeric range of −N/+N items can be a predetermined range. For example, N can have a default value (e.g., 3 items). Also, for example, N can be a tunable value (e.g., as selected by a user).

In other embodiments, a media queue can include media information for items played within a time range. For example, N can represent a range of minutes and the queue can include media information for items played in the previous N minutes, a currently playing item, and items queued to be played in the next N minutes. The time range of −N/+N can be a predetermined range of minutes or hours. For example, N can have a default value (e.g., 15 minutes). Also, for example, N can be a user-selected, tunable value.

Sequence numbers 102 indicate an order of items in the media queue. In the example of FIG. 1, negative values of sequence numbers 102 indicate media items that have already been played, a zero-value sequence number 102 indicates a current media item, and positive values of sequence numbers 102 indicate media items that are queued to be played. Media queue 100 can be a playlist of audio tracks such as songs or a playback queue of videos.

Examples of metadata 106 for audio tracks include: a unique identifier (ID) 104 for the track, a song title, an artist, an album, an audiobook title, a podcast title, a release year, a composer, a musical genre, a record label, a musical producer, a duration, an audio quality indicator, a source indicator (e.g., local storage, cloud-based storage, or a streaming service), and a rating. A rating for audio tracks can include: a critical rating by one or more music critics (e.g., an individual or aggregate critical rating), a popularity rating based on sales, plays, or downloads, an individual user rating based on a number of plays by that user, or a content rating based on lyrics. Media information for an audio track can also include album artwork, a musical group's logo, or other graphics related to the track.

Examples of metadata 106 for video files include a unique ID 104 for the video, an episode title, a scene title, an actor, a movie title, a director, a producer, a duration, a studio (e.g., a film or television studio), a genre, a source indicator (e.g., local, cloud, or streaming), and a rating. A rating for video files can include: a critical rating by one or more film or television critics; a popularity rating based on ticket sales, television viewership, or downloads; or a content rating such as a Motion Picture Association of America (MPAA) film rating or a television content rating. Media information for a video file can also include artwork such as a movie poster image, a television show logo, a studio logo, image of an actor, or other graphics related to the video file.

Media queue 100 can be a playback queue or playlist for a media application. In one example, media queue 100 can be a song playlist populated with media items selected by the user of a music player application. Media queue can also be automatically populated by a media application. For example, if the media player application is in a shuffle or random mode, media queue is populated with items selected by the media player application. In another example, media queue may be populated with items in a sequential order, such as audio book chapters, movie scenes, or television or podcast episodes. In any event, media queue 100 includes past items that have been played, a current item, and items to be played in the future. Media information, including metadata 106, for a currently playing media item (e.g., a "now playing" song or video with sequence number 0) can be displayed in a media application, along with information for other media items in the application's playback queue or playlist. In embodiments, media information for a specified range of media items in the playback queue or playlist is shared with one or more client. For example, media information for a requested range (e.g., −N/+N) of media items can be provided to clients for displaying at client devices such as smartphones, smartwatches, cars, and other client devices. A media application can send media information for a range of items in media queue 100, including IDs 104, sequence numbers 102, metadata 106, and other media information (e.g., artwork) to a media daemon, which can then forward requested portions of the media information to clients.

A certain number of media items can be included in a playlist or playback queue of a media application such as a music player application (e.g., iTunes®). The media application can keep a record of a currently playing item (e.g., an item with a sequence number 102 of 0), items in the list that have been played in the past (e.g., items with negative values of sequence numbers 102), and items that are queued to be played in the future (e.g., items with positive values of sequence numbers 102). For example, if a music player application finishes playing a song, the application goes to the next song in media queue 100 and can send a signal to a media daemon indicating that the unique ID 104 of the "now playing" song has changed. For instance, the song that finished playing is added to the list of previously played items, the "now playing" song is updated, and the queue is advanced to indicate the next song to be played. In the example of FIG. 1, the sequence number 102 of the previously played song will change from 0 to −1 and the sequence number 102 of the new current played song will be 0. Sequence numbers 102 for songs to be played will also be incremented by 1. The media application can send information informing a media daemon that the media queue 100 has changed as a result of finishing a song. Media information for a requested range of this updated playlist can be sent to connected clients via the media daemon.

The media application can also keep track of changes to media queue 100 resulting from user interaction with the application. For example, when a user re-orders items in a playlist, adds items to the list, or removes items from the list, the media application stores information for the changed list. In the example of FIG. 1, media queue 100 is changed to re-order items to be played, resulting in changed media queue 150. As shown, the order of the three items to be played in queue 150 is reversed as compared to the original queue 100. This change is reflected in sequence numbers 152. In response to the re-ordering of the queued media items, corresponding IDs 154 of the media items are also re-ordered. Media information for changed media queue 150, including information for the currently playing item, and the new sequence of items to be played can be sent to the media daemon. The media daemon can then send the sequence numbers 152 and IDs 154 for the changed media queue 150 to clients. By correlating the IDs 154 to stored metadata 106 and artwork for items that have already been sent to the clients, the media daemon can avoid re-sending redundant data to the clients. Example data flows for using a media daemon to share media information across client devices and application are described below with reference to FIG. 2.

II. Data Flows for Sharing Media Information

Media information for media items in a queue of a media application (e.g., a media player app) can be provided to client applications and client devices without having to broadcast the media information from the media application to all of the client applications and devices. Normally, a media application would need to broadcast media information for a predetermined set of data (e.g., information for a "now playing" item) and provide updates periodically or when the data changes (e.g., when the "now playing" item changes). This can result in transmitting redundant media information to clients and may not allow client applications to request desired media information when they need it. In example embodiments, client applications can send respective requests (e.g., requests for information regarding a range of items in a queue) to a media daemon, which in turn can send a request to the media application for the requested information. This section describes communications that may be used to facilitate sharing media information for a range of media items in a queue of a media application with multiple client applications and client devices according to embodiments described herein.

A. System Environment

Figure 2:
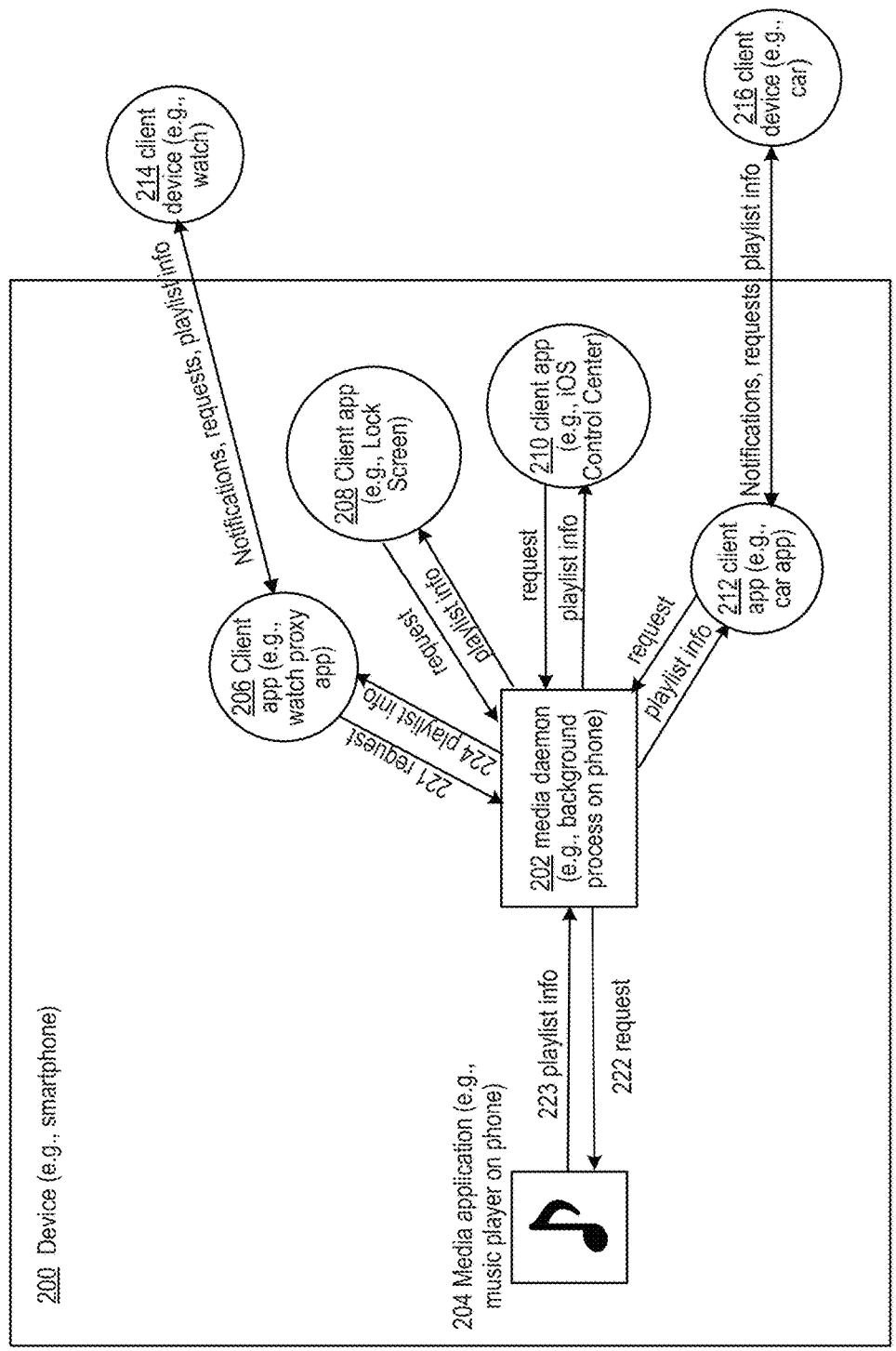
FIG. 2 is an example block diagram of a system showing communication of media information between a media application, a media daemon, and clients.

FIG. 2 illustrates a system infrastructure than can implement sharing of media information for a range of media items across multiple clients. FIG. 2 includes a media daemon 202, a media application 204, client applications 206, 208, 210, 212, and client devices 214, 216. As shown in FIG. 2, the media application 204 can be a music player application. Media daemon 202 can be a media remote daemon that is a background process of an operating system running on a computing device 200. Media application 204 can be hosted on a computing device 200 that accesses stored media assets, such as audio tracks or videos that can be played using the media application 204. Non-limiting examples of such computing devices include smartphones, tablets, and media players. Media application 204 can acquire media assets from a cloud-based service or a host computer. The media application 204 enables a user to manage media assets, such as songs and videos.

As shown in FIG. 2, client application 208 is a lock screen of the device running the media application 204, and client 210 is a control center display (e.g., a Control Center display of an iOS operating system produced by Apple Computer, Inc.). Client application 208 can be a native application such as a lock screen of a smartphone, a tablet, or a media player device. A client can also be a third-party application, such as a third-party media app. The media application 204 can also be a native or third party application. In certain embodiments, the media application 204 can be a video player application, or another application that is used to access media items.

FIG. 2 illustrates example data flows for providing playlist information from media application 204 to client applications 206, 208, 210, 212, and client devices 214, 216. As shown, one example data flow begins when media daemon 202 receives a request 221 for media information from client application 206. Request 221 can be a request for current media information (e.g., metadata and artwork) for a range of media items in a queue or playlist of media application 204 that client application 206 is interested in. The range indicated in request 221 can include a current media item (e.g., a "now playing" item) and at least one media item from a previous set of items already played and/or a future set of items queued to be played. In response to receiving request 221, media daemon 202 can send a request 222 to media application 204. Request 222 can be a request for any changes to media information for media items in the range of media items identified in request 221. That is, request 222 may only be a request for media information that media daemon 202 does not already have. In response to receiving request 222, media application 204 can send playlist information 223 back to media daemon 202. Playlist information 223 will include the information requested in request 222. Upon receiving playlist information 223, media daemon 202 can forward playlist information 224 to client application 206. Playlist information 224 can include media information from media application 204 for the range of media items that client application 206 indicated in request 221.

In an embodiment, the first time client application 206 makes a request 221 for information about a range of media items in the queue of media application 204, the corresponding response, playlist information 224, can include a specified set of information about the requested range of media items (e.g., all information available at media application 204). As shown, request 221 is received by media daemon 202, and playlist information 223 is obtained from media application 204 as a result of media daemon 202 forwarding its own request 222 to media application 204. For subsequent requests from client application 206, logic on device 200 can be used to determine what changes have been made to the range of media items as compared to information previously sent to client application 206. For example, sometimes a change to a music playlist does not change a song in the list, but only changes an order of songs. In this example, it would be redundant to send over all the metadata and artwork about the songs again. Instead, an embodiment just sends the client the updates to the order. This can be accomplished using an identifier that is unique to each song. This identifier can be used to obtain all the metadata about the song that was previously sent to the client. According to this embodiment, when there are changes to a sequence (order) of a playlist, the changed sequence is sent to client application 206 as an ordered list of unique identifiers. Client application 206 then correlates the identifier to the metadata that is already available to client application 206. In this way, redundant data is not sent to client application 206, thus reducing power consumption by device 200.

In one example, media application 204 sends a communication with media information about a changed playlist to media daemon 202 in response to an implementation change. An example of an implementation change that may trigger this communication is a change to the implementation of media application 204. For instance, a version update to media application 204 may result in changes to metadata or media information for a playlist. In certain embodiments, implementation and queue changes are not broadcast to client applications 206, 208, 210, 212. Instead, the changes are sent by media daemon 202 to individual clients in response to requests received at media daemon 202 from clients. These changes are sent from media application 204 to media daemon 202 so that they can be propagated to client applications 206, 208, 210, 212.

Another example data flow can handle a change to media application 204. One example of a change to media application 204 is a change from using a native media application to using a third party media application. Another example is a change from a music player app to a video player app. When there is a change to media application 204, different media information may need to be sent from the media application 204 to client applications 206, 208, 210, 212 via media daemon 202. For example, as discussed above with reference to FIG. 1, metadata and artwork for audio files can differ from metadata and artwork for video files. Also, for example, a native music player app may have different information in its playlist than a third-party music player app. Similarly, a native media application may display different information for media items in its playback queue than a third-party media application.

With continued reference to FIG. 2, in response to a request from client app 208, media daemon 202 can send a request for media information about a range of media items in a re-ordered queue of media application 204. The request is sent from client application 208 while media application 204 is executing. The changed media queue of media application 204 includes a previous set of media items that have been played, a current media item, and a re-ordered future set of media items that are to be played in the future. The request specifies that the range should include the current media item and at least one media item from the previous set and/or the future set. Responsive to the request, media daemon 202 receives at least a portion of media information from media application 204, the received media information including the current, changed order of media items and an identifier for each media item in the range of media items. Here, the received media information includes the changed order of media items and an identifier for each media item in the range of media items. In an embodiment, if client app 208 already has metadata and other information (e.g., artwork) for items in the queue, media daemon 202 will only send the re-ordered sequence numbers and IDs for the queue. In this way, the data flow for queue order changes avoids redundantly sending data to client application 208 that client application 208 already has.

Device 200 can also implement a data flow to handle a change to the content of one or more media items in the playback queue. Examples of changes to content of a media item include changed artwork and changed metadata (e.g., a changed rating). A request 221 can be sent requesting information about a range of media items in the queue of media application 204 while the application is running. The queue includes a previous set of media items that have been played by the media application, a current media item, and a future set of media items that are to be played, and the queue includes at least one media item whose content has changed. The request is sent from media daemon 202 to media application 204 and specifies that the range is to include the current media item and at least one media item from the previous set and/or the future set. In response to the request, media daemon 202 receives at least a portion of media information from media application 204, the received media information including an order of media items and an identifier for each media item in the range of media items. Then, in the example of FIG. 2, the received media information for the queue with the changed media item is sent from media daemon 202 to client device 216, which can then display information about the range of media items on e.g. a display of the car. A similar data flow can be used when the content of the queue itself changes. For example, the above-described data flow can be employed when a new media item is added to a future set of a queue or when a media item is removed from the queue.

In some examples, a user may utilize at least two electronic devices to access media information. One of the electronic devices may be a smartphone running a client app (e.g., client app 206), and the other device may be a wearable device such as client device 214. The user's smartphone running client app 206 may act as a companion or host device for the user to access media information for a playlist and client app 206 can be a proxy app to facilitate this access. However, there may be instances where the user is only interacting with the wearable device to access information for the playlist. In such instances, client app 206 may request current media information for a range of media items in a queue or playlist of media application 204 on behalf of client device 214. One such example may include while the user is exercising. In this case, the user may choose to interact with wearable client device 214 due to its smaller size, and may opt to request media information via interaction with client device 214. As such, if client device 214 can access media information through the companion device running client app 206, the companion submits a request for a range of media information to media daemon 202 on behalf of client device 214.

B. Client Applications for Other Devices

As shown in FIG. 2, device 200 can also be used to share media information between media application 204 and client applications for other devices, such as client devices 214 and 216. Media application 204 can be executing on device 200 that is remote from client devices 214 and 216. In the example of FIG. 2, client device 214 is a wearable device (e.g., a watch) and client device 216 is a car. According to this example, client application 206 is a watch proxy application for the watch and client application 212 is a car application.

Data flows for sharing media information with client applications for other devices can be initiated when client devices 214 and 216 send their requests for media information to client applications 206 and 212, respectively. In the example shown in FIG. 2, a request 221 can be sent from client application 206 after receiving a request from client device 214 for media information. Request 221 can be a request on behalf of client device 214 for information about a range of media items in the playlist or playback queue of media application 204, and request 221 is sent from client application 206 while the media application 204 is executing. Upon receipt of request 221, client application 206 can forward request 221 to media daemon 202. This can trigger media daemon 202 to send request 222 to media application 204. In response to request 222, media application 204 can send playlist information 223 to media daemon 202, which then forwards playlist information including the requested media information to client application 206.

As shown in FIG. 2, client application 206 can be an application running on a mobile device 200 such as a smartphone, client device 214 can be a wearable device with limited or no wide area network (WAN) connectivity such as a smartwatch. The smartphone can serve as a companion device to client device 214 by providing WAN service (e.g., cellular data service) to the smartwatch. The smartwatch can have an application for displaying media information, such as a range of a media queue or playlist including an indication of a now playing item. In this example, the companion smartphone device has the smartwatch application 206 as a client, which makes a request for media information on behalf of the smartwatch. The request can be for media information about a range of media items in a queue of a media application. The request can be sent from the smartphone to a media daemon, and the requested information (e.g., metadata for the range of media items) is received at the smartphone. The smartphone can then forward the information to the smartwatch.

In the example of FIG. 2, client application 206 can be a proxy application for client device 214, which is a wearable device (e.g., a smartwatch). Client application 206 can interface with client device 214 in order to provide media information. Client applications can be native or third-party software applications running on mobile devices such as device 200. An application package for a particular software application can include software components for a smartphone companion device hosting media application 204 and for wearable client device 214, e.g., a companion client application 206 and an application on client device 214, respectively.

For example, a software application that displays media information for a playback queue (e.g., a queue of media application 204) can have one component (e.g., client app 206) that runs on device 200 and a corresponding component that runs on client device 214. In addition, the application can include an application extension (not shown). The application extension can be used for communications between the application on wearable client device 214 and the client application 206 on companion device 200. The application extension can execute on the client device 214 or companion device 200. These software components can execute independently or together, e.g., as part of providing updated media information to wearable client device 214. In other embodiments, the software components can be downloaded separately to the two devices. Client application 206 on companion device 200 and the application on client device 214 are examples of client applications.

In certain embodiments, requests from smartwatch client device 214 can be sent to client app 206 on the phone in response to user inputs, such as movements of the smartwatch's crown. For instance, a time travel complication for a music playlist can be displayed on the smartwatch whereby if the user adjusts the crown to show future times, metadata for upcoming songs queued to be played at those future times is displayed. Similarly, if the user adjusts the crown to show past times, metadata for songs previously played at those past times is displayed. The metadata can be requested in blocks and stored locally on the smartwatch so it is immediately available, e.g., as the user turns the crown to show more of a media queue or playlist.

The example data flows shown in FIG. 2 can be used to share information for items accessed by media application 204 (including a third-party app) installed on device 200 (e.g., a smartphone). The smartphone can be a companion device for a wearable device such as, for example, a smartwatch client device 214. The phone can inform the wearable client device 214 that media information has changed (e.g., updates to a playlist, media item up next, etc.). At this point, client device 214 will grab the updated data, or in an alternative embodiment, client device 214 sends a request to the smartphone to update the data.

Similar data flows can be used to share media information between media application 204 and client device 216 (e.g., a car). For example, client device 216 can send a request for media information to client application 212 (e.g., a car application on device 200). Then, client application 212 can forward the request to media daemon 202. At this point, media daemon can determine what media information it needs from media application 204 in order to fulfill the request received from client application 212. The needed information is indicated in request 222 that is sent from media daemon 202 to media application 204. As described above, the queue of media application 204 can include a previous set of media items that have been played, a current media item (e.g., a "now playing" song), and a future set of media items that are queued to be played, and request 222 can specify that the range should include the current media item and at least one media item from the previous set and/or the future set. In response to the request, media daemon 202 receives playlist information 223 with at least a portion of media information from media application 204, the received media information including an order of media items and an identifier for each media item in the range of media items. The received media information is then sent to client application 212, which can be used to send media information to client device 216 (e.g., the car). Client device 216 can display information about the range of media items (e.g., on a display screen of the car).

III. Communications of Media Information Between Applications on Same Device

Figure 3:
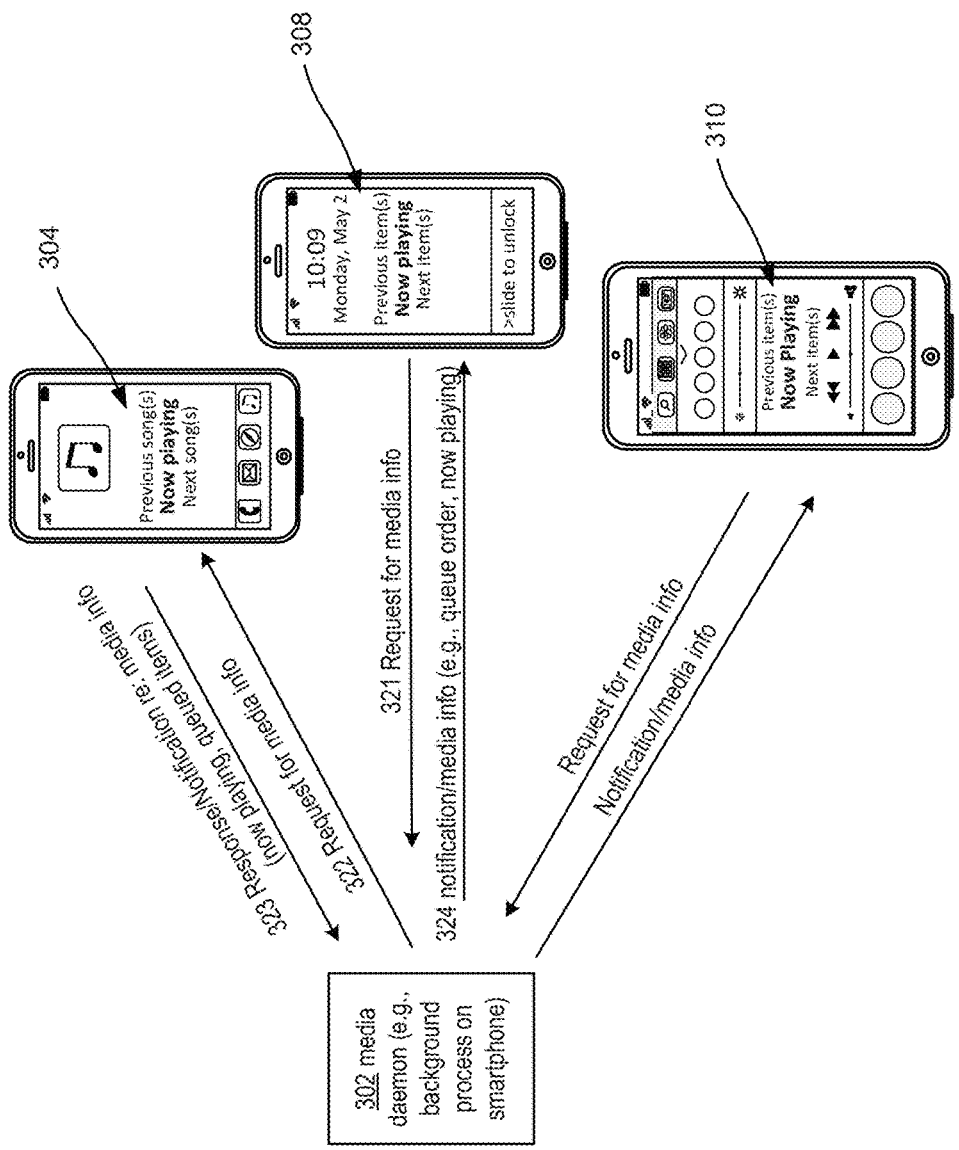
FIG. 3 is an example block diagram showing embodiments of communicating media information between a media daemon and client applications on a client device.

FIG. 3 is an example block diagram showing specific examples of data flows for communicating media information between a media daemon and client applications on a device 300. In particular, FIG. 3 depicts examples of some of the data flows discussed above with reference to FIG. 2 for communicating media information between a media daemon on a smartphone device and client apps running on the smartphone.

As shown in FIG. 3 media daemon 302 can be used to share media information for media items in a playback queue between a media application 304 executing on device 300 and other applications 308 and 310 that are on that same device 300. Media daemon 302 can be implemented as a media remote daemon that runs as a background process on device 300. While FIG. 3 depicts an embodiment where media application 304 is a music player application executing on a smartphone and media information from the music player is shared with client application 308 (e.g., a lock screen) and client application 310 (e.g., a control center) on the smartphone, it is to be understood that media information can be shared between other types of client applications (e.g., a video player) on other types of devices (e.g., a tablet, a laptop, a gaming console, a networked home appliance, or another computing device).

In the example of FIG. 3, a request 321 for media information for a range of media items can be sent from client application 308 to media daemon 302. Responsive to request 321, request 322 may be sent from media daemon 302 to media application 304. In response to request 322, media daemon 302 receives communication 323 from media application 304. Communication 323 can include at least a portion of media information from media application 304, the media information including an order of media items and an identifier for each media item in the range of media items. Then, media daemon 302 sends media information received with communication 323 as communication 324 to client application 308, which can then display information about the range of media items (e.g., on the lock screen).

In another embodiment, media application 304 can send communication 323 as a change notification to media daemon 302. The change can be a new "now playing" item, a change to the playback queue, or a change to media information (e.g., new artwork or metadata for a media item in the queue). The media daemon 302 can forward notifications to client apps 308 and 310. Client apps 308 and 310 can then request information about a range of media items in the queue of media application 304.

In one example, after an implementation change occurs, media application 304 can send communication 323 as a change notification to media daemon 302, which can then inform client applications 308 and 310. That is, a notification can be sent to client applications 308 and 310 via media daemon 302. Triggered by the notification, a request 321 for media information can be sent to media daemon 302 from client application 308. At this point, media daemon 302 forwards request 322 for media information to media application 304, and the data flow described above is carried out to provide the requested media information to client application 308 as communication 324.

In certain embodiments, changes (e.g., media app changes, implementation changes, and queue changes) are not broadcast to client applications 308 and 310. Instead, the changes are sent by media daemon 302 to individual clients in response to requests received at media daemon 302 from clients. For instance, in response to a change to a different media application 204 (i.e., a new media app is launched), the media application can send communication 323 as a change notification to media daemon 302. Responsive to the notification, media daemon 302 can send a request 322 for information about a range of media items in the queue of the different media application 304. In response to request 322, media daemon 302 receives playlist information with at least a portion of media information from the different, currently executing media application 304. This information may be stored in a cache of device 300 that hosts media application 304, but not immediately sent to client applications 308 and 310.

In some embodiments, instead of forwarding the media information received with communication 323 to client applications 308 and 310, the media daemon 302 waits for a request from a client for the information (see, e.g., request 321 from client application 308). The information received in communication 323 can include an order of media items, an identifier for each media item in the range of media items, and media information for each media item. After receiving a request from a client application, media daemon 302 can send the received media information to the client application (see, e.g., communication 324 to client application 308), which can then display information about the range of media items. Client applications 308 and 310 can also display an indication of the change to the currently running media application 304. For example, an icon or other user interface element can be displayed to indicate that the media application 304 has changed from a music player app to a video player app.

Device 300 can also be used to implement a data flow to handle a change to the order of items in the playback queue. For example, when the order or sequence of media items in the playback queue of media application 304 changes, media application 304 can send communication 323 as a change notification with information for the changed playback queue to client app 308 (e.g., a lock screen) via media daemon 302. As discussed above with regard to FIG. 1, when the order of media items in the queue changes, the new order can be indicated with reordered sequence numbers 152 and IDs 154. For instance, communication 323 can be a change notification indicating that the order of media items has changed, and a subsequent communication may be used to indicate how the order has changed. That is, after the change notification has been sent by media application 304, an additional request may be sent via media daemon 302 to get the new order.

In an embodiment, the new queue order and media information for items in the queue can be cached at device 300 (e.g., a smartphone device hosting media daemon 302, media application 304, and client applications 308 and 310), which facilitates submitting a request back to media application 304 to get the new order. In example data flows of FIG. 3, notifications indicate something has changed or happened, and media daemon 302 then automatically requests what the new information is from media application 304. For instance, once a client app (e.g., lock screen client 308) asks for information for a changed media queue, logic can be executed to determine what media information for the queue the client might already have. Such logic improves the efficiency of device 300 by avoiding transmission of media information that a client already has.

Media application 304 can send a communication 323 as a change notification to media daemon 302 when there is a change to an item in the media queue. For example, when media information for a playlist changes (e.g., a change to a "now playing" item), communication 323 can be a notification sent to media daemon 302, which can respond to the change notification by sending media information to client applications 308 and 310 (see, e.g., communication 324). In some embodiments, media daemon 302 receives a notification of media information that is available from media application 304 and forwards media information pertaining to the notifications to client applications 308 and 310, who are interested in listening to certain types of media information changes occurring in media application 304.

As depicted in FIG. 3, at least a portion of the received media information can be displayed in client application 308 on device 300 when the lock screen is displayed, and while media application 304 continues to run in the background. Similarly, client application 310 of device 300 can be a control center that displays at least a portion of the received media information while media application 304 is executing in the background and playing the "now playing" media item. When the media information changes, media application 304 can send the changes to media daemon 302. For example, when the current item changes to the next item in the media queue, the changed media queue is sent to media daemon 302 as communication 323. Media daemon 302 can push updated media information to client applications 308 and 310 in response to receiving the updated information from media application 304. Alternatively, client applications 308 and 310 can request updated media information by sending requests to media daemon 302 when they want updates.

IV. Communications of Media Information Between Devices

Media information can be shared between a companion device running a media player app (e.g., a smartphone) and a client device (e.g., a wearable device) without having to broadcast the information from the companion device. Normally, the companion device would need to periodically broadcast media information to the client device, or the client device would need to periodically request media information. In some examples, a user of either device can specify a desired range of media items in a playback queue that are to be shared between the companion device and the client device, and not have to provide further inputs to trigger requests for the information. For example, a media daemon on the companion device can send notifications to a client application indicating that information for an item in a playback queue has changed, and the client application can then push the changed information to the client device. This section describes inter-device communications that may be used to facilitate sharing media information between devices according to embodiments described herein.

Figure 4:
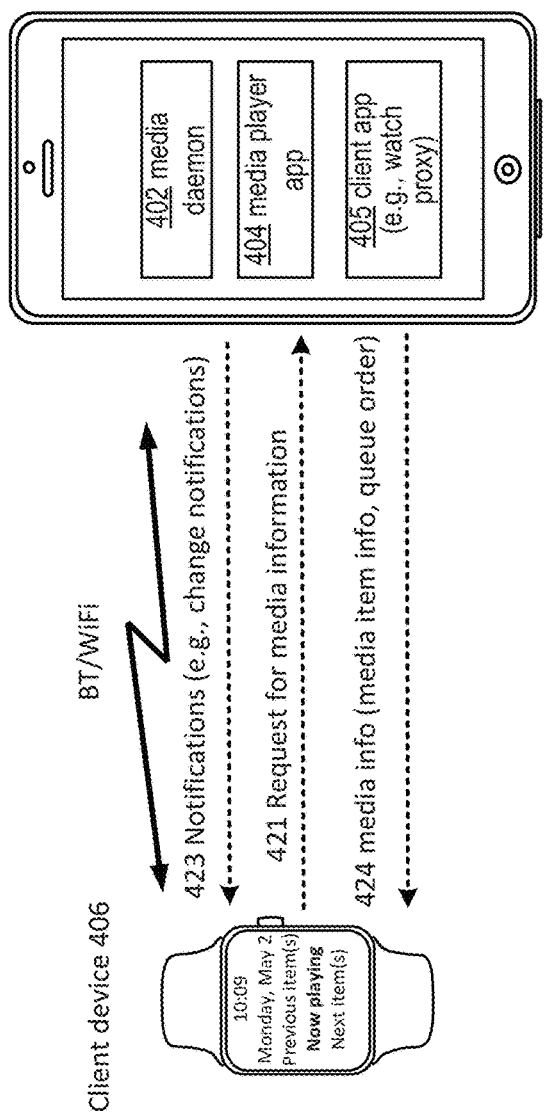
FIG. 4 is an example block diagram showing embodiments of communication of media information between a companion device and a client device.

FIG. 4 is an example of a block diagram showing embodiments of communication of media information between a companion device 400 and a client device 406. In the example of FIG. 4, device 400 hosts media daemon 402, media player app 404 and client app 405, where device 400 is a companion smartphone device for wearable client device 406. The communication of media information 424 can be done after allowing tethering on a user interface and specifying use of particular device 400 to gain network access. In other examples, a user can specify only some general parameters, and not have to explicitly allow access on a device-by-device basis.

An application package for a particular software application can include software components for smartphone companion device 400 hosting media player app 404 and for wearable client device 406, e.g., a companion client app 405 and an application on client device 406 (not shown), respectively. For example, a software application that displays media information for a media queue (e.g., a playlist or queue of media player app 404) can have one component (e.g., client app 405) that runs on companion device 400 and a corresponding component that runs on client device 406. In addition, the application can include an application extension (not shown) that can be used for communications between the application on client device 406 and the client app 405 on companion device 400. The application extension can execute on the wearable client device 406 or companion device 400. These software components can execute independently or together, e.g., as part of providing updated media information 424 to wearable client device 406. In some embodiments, the software components can be downloaded separately to the two devices 400 and 406. Client app 405 on companion device 400 and the application on client device 406 are examples of client applications.

A watch communications daemon (not shown) on companion device 400 can work in conjunction with media daemon 402 and determine how communications are to occur with wearable client device 406. The watch communications daemon can determine a particular manner for sending media data (e.g., data for a playlist complication) from client app 405 on companion device 400 to wearable client device 406. For instance, the watch communications daemon can determine which applications are currently running on client device 406, and only send media information to a particular application on client device 406 when that application is running. If the particular application is not running on client device 406, then the media information 424 can be queued. In other examples, the watch communications daemon can perform a background process for sending media information 424 (e.g., metadata and artwork) according to specified rules, e.g., sending media information 424 for a specified range or amount of time, and when not finished then pause (e.g., so that other data can be sent).

The watch communications daemon can also process any media information such that the media information 424 sent to client device 406 is in a format that can be determined by wearable client device 406. For example, client app 405 may send media information in a same format regardless of the destination device, and the watch communications daemon can translate the data into a format suitable for a watch and send that media information 424 to the watch. For example, only higher level communication options may be exposed to the client apps on companion device 400, and not all of the lower-level options may be exposed to the client apps. The watch communications daemon can also translate requests for media information and other data received from client device 406 into a format that is readable by client app 405 or media player app 404. For example, watch communications daemon can interpret one or more request commands from client device 406, such as a request 421 that requests media information (e.g., media item information to be displayed in a complication) from client app 405 or media player app 404. The watch communications daemon can then receive a request 421 for the media information from client device 406, and then forward it in a suitable format to client app 405 or media player app 404. The watch communications daemon can interact with an application manager (not shown) that can launch client app 405, if needed.

As shown in FIG. 4, companion device 400 can serve as a companion device to wearable client device 406 (e.g., a smartwatch) by providing WAN service (e.g., cellular data service) to the smartwatch. The smartwatch has a complication for displaying media information, such as the range of a media queue or playlist including an indication of a now playing item. In this example, the companion device 400 is a smartphone serving as a host or companion device to the wearable client device 406. That is, companion device 400 has the wearable device as a client device. Notifications can be received from media player app 404 at media daemon 402 on companion device 400. In the example of FIG. 4, the notifications can be forwarded to client device 406 as change notifications 423 indicating that media information has changed (e.g., a change to a new media application, a new "now playing" item, a changed queue order, a changed queue entry, or changed content of a media item). The notifications can be sent to client app 405 on companion device 400, which can then be forwarded as change notifications 423 to client device 406. In the example of FIG. 4, client app 405 is a watch proxy app on companion device 400 that handles communications between companion device 400 and wearable client device 406, and companion device 400 can communicate with client device 406 via a Bluetooth® (BT), Bluetooth® Low Energy, Apple Wireless Direct Link (AWDL), or Wi-Fi connection that is used to transfer media information requests 421, change notifications 423, and media information 424 between companion device 400 and client device 406.

A request 421 can be sent from client device 406 and received by client app 405, where request 421 is a request for media information pertaining to a change notification 423 previously sent by media daemon 402. The change notification 423 may have been triggered by an event in media player app 404 such as a change to a new "now playing" item or a change to another item in the playback queue of media player app 404. The request 421 can be forwarded by client app 405 to media daemon 402 on behalf of wearable client device 406. Then, media daemon 402 on companion device 400 detects the request 421 for media information. The request 421 can be for media information about a range of media items in the playback queue of media player app 404. In this example, media player app 404 sends its queue information to media daemon 402. The requested information (e.g., metadata for the range of media items) is then obtained from media player app 404. Companion device 400 then forwards the obtained information to client app 405, which sends the media information 424 to wearable client device 406 for display at wearable client device 406.

The following example communications flow is described with continued reference to FIG. 4. A media player app 404 is playing media items on companion device 400. Wearable client device 406 wants to determine what items are playing so it can display information about them, so wearable client device 406 sends request 421 to media player app 404, via client app 405, indicating the section of songs wearable client device 406 cares about (e.g., the next 10 songs/videos to be played, the current song or video). A user of wearable client device 406 or client app 405 can decide how much media information is needed. For example, the range of items can be a user-selected numeric range (e.g., previous 5 songs and next 5 songs). In another example, the range can be a user-selected time range (e.g., songs played in last 15 minutes and songs queued to be played in next 30 minutes). In any of these examples, request 421 can indicate the desired range of media items that client device 406 is interested in. Media daemon 402 can provide the requested information from media player app 404 to client app 405. Client app 405 can then forward media information 424 to wearable client device 406, and wearable client device 406 can display media item information as shown in FIG. 4. Subsequently, if something in the playback queue of media player app 404 changes, client app 405 can be notified of this event by media daemon 402, and client app 405 can send an event or change notification 423 to client device 406 indicating what has changed. Wearable client device 406 can then submit another request 421 to client app 405 for updated information. For example, client app 405 can request media information from media daemon 402 on behalf of client device 406 when it wants, or media daemon 402 can receive events for later delivery to wearable client device 406 via client app 405.

V. Example Method for Sharing Media Information

Figure 5:
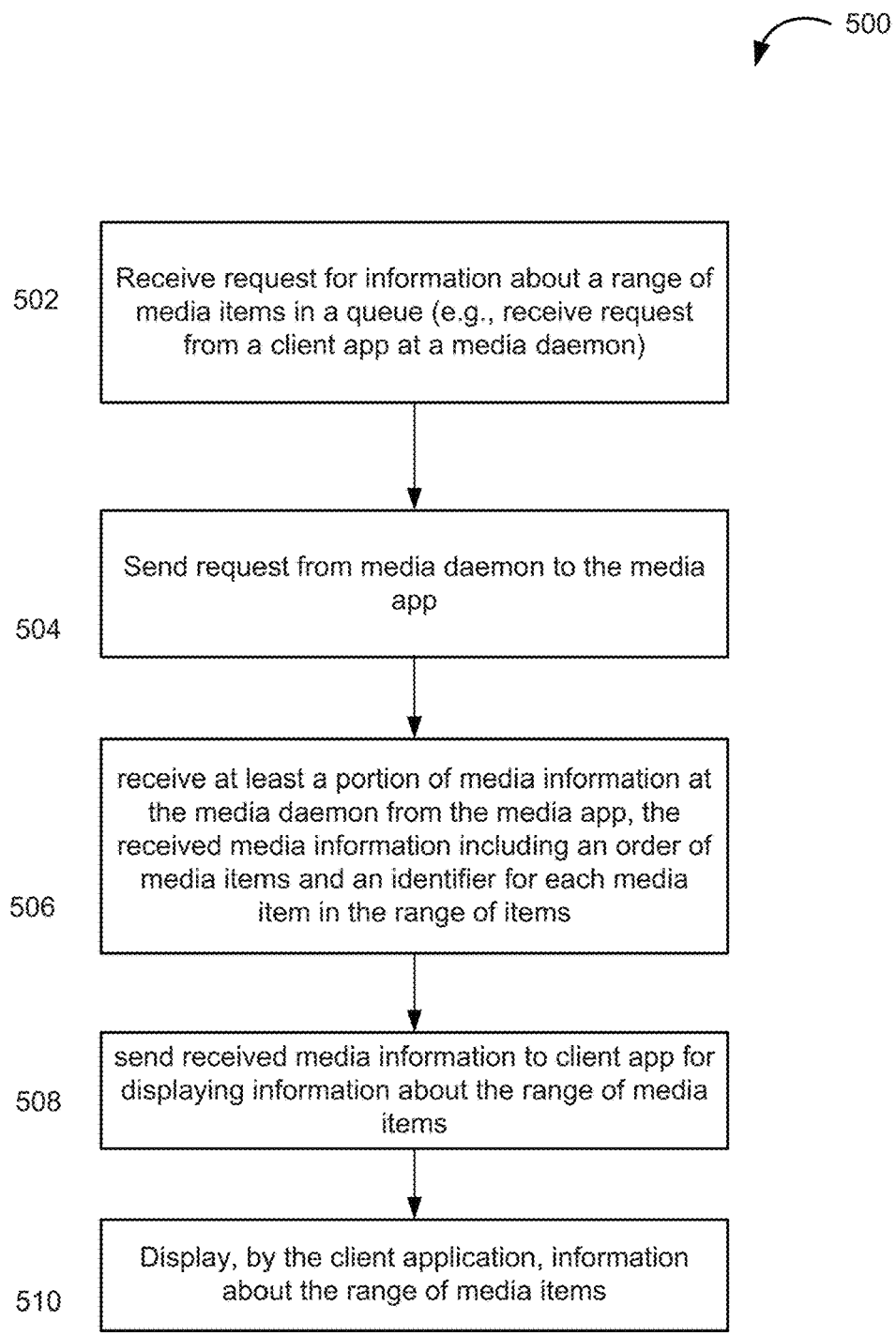
FIG. 5 is a flowchart of an example method of using a media daemon to provide media information from a media application to a client.

FIG. 5 is a flowchart of an example method of sharing media information between client devices and applications. The method 500 of FIG. 5 may be implemented using computing devices (e.g., device 200 of FIG. 2) by executing computer-executable instructions or the like stored thereon.

At 502, a computing device (e.g., a device hosting a media daemon) may receive, a request for information about a range of media items in a queue. The queue can include a previous set of items that have been played by a media application, a current item, and a future set of items to be played. The request may specify that the range is to include a currently playing item and at least one item from the previous set and/or the future set. In one example, the request is received from a client application running on a client device and the request is received at a media daemon.

At 504, a request is sent from the media daemon to the media application. The media application may be a music player application, a video player application, or another application configured to access media items. In some embodiments, the media application may be executing on the same device as the requesting client application. In other embodiments, the media application is executing on another computing device remote from the requesting client application.

The range of media items may be a numeric range for a number of media items that have been played in the media application and a number of media items that are queued to be played in the media application. For example, the range of media items may be a tunable numeric range N (e.g., as selected by a user) for a number of the last N media items that have been played in the media application and the next N media items that are queued to be played in the media application. In an embodiment, the range may be a time range of media items that have been played in the media application within the time range or are queued to be played in the media application within the time range.

At 506, at least a portion of media information is received at the media daemon from the media application. As shown, the received media information may include an order of media items and an identifier for each media item in the range of media items. For example, the received media information may include sequence number 102 for each media item in the range of media items and an ID 104 for each media item in the range. The received media information may include metadata identifying, for each media item in the range, one or more of a title, an artist, an album name, a duration, a rating, a publisher, a genre, and other information such as artwork.

At 508, the received media information is sent from the media daemon to the requesting client application for displaying information about the range of media items. In certain embodiments, information about the range of media items can include metadata for each media item in the range. For example, the information can include one or more of a title, an artist, an album name, a duration, a publisher, a genre, and a rating. Also, for example, the information can include an image or artwork (e.g., album artwork) for media items in the range.

At 510, the client application may display media information about the range of media items. For example, the client application can display metadata for one or more items in the range of media items. For instance if the request for information specified that the range was to include a currently playing item, one item from the previous set and one item from the future set, then the client application can display an item title, artist and other metadata for these three items. In one example, a duration, title, and artist metadata can be displayed along with artwork for a "now playing" item and less data can be displayed for other items in the range. According to this example, only a title and artist may be displayed for a previously played item and items queued to be played in the future. Example user interfaces for displaying information about the range of media items are provided in FIGS. 6 and 7, which are discussed below.

VI. Example User Interfaces

As described above with reference to FIGS. 3 and 5, client applications can display media information about a range of media items. The media information can be displayed in user interfaces of the client applications. The user interfaces can be rendered on a display of a smartphone, a display of a wearable device (e.g., the face of a smartwatch), a display of a car, or other suitable display devices. The client applications can include native or third-party media player apps, a lock screen, a control center, applications for presenting a complication on a smartwatch, or other applications that can display media information. Example user interfaces for displaying media information are described below with reference to FIGS. 6 and 7.

Figure 6:
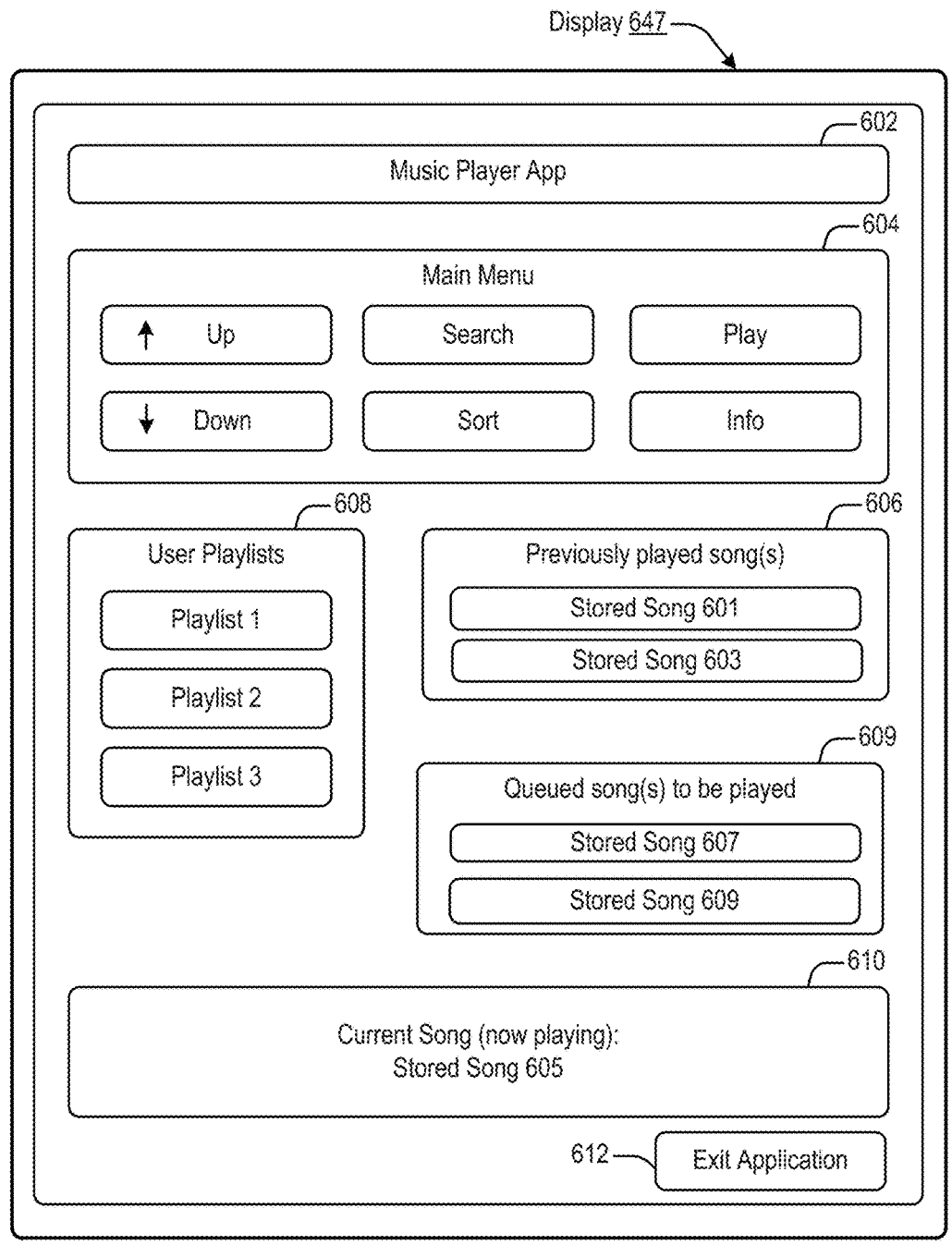
FIG. 6 illustrates an example user interface for displaying media information on a mobile client device.

FIG. 6 illustrates an example of a user interface for use with a music player application that may be used to display media information in display 647 of a client device. The media information may be received at the client device by performing method 500 described above with reference to FIG. 5. In one example, the client device can be a smartphone. The smartphone may be executing the media application locally, or it may receive media information from a remotely executing media application via a media daemon. The interface includes an application title bar 602 displaying the title of the media application (e.g., Music Player App), main menu 604 with controls to navigate to and interact with media items (e.g., up, down, search, play, sort, etc.), user playlists menu 608 with playlist-specific controls (e.g., playlist 1, playlist 2, etc.), and exit button 612. FIG. 6 further illustrates that a portion of the user interface displays a previous set 606 of one or more media items that have already been played (e.g., previously played songs including information indicating that stored song 601 and stored song 603 have already been played. As shown, the user interface also includes an active item bar 610 displaying information regarding the currently playing media item (e.g., stored song 601).

Figure 7:
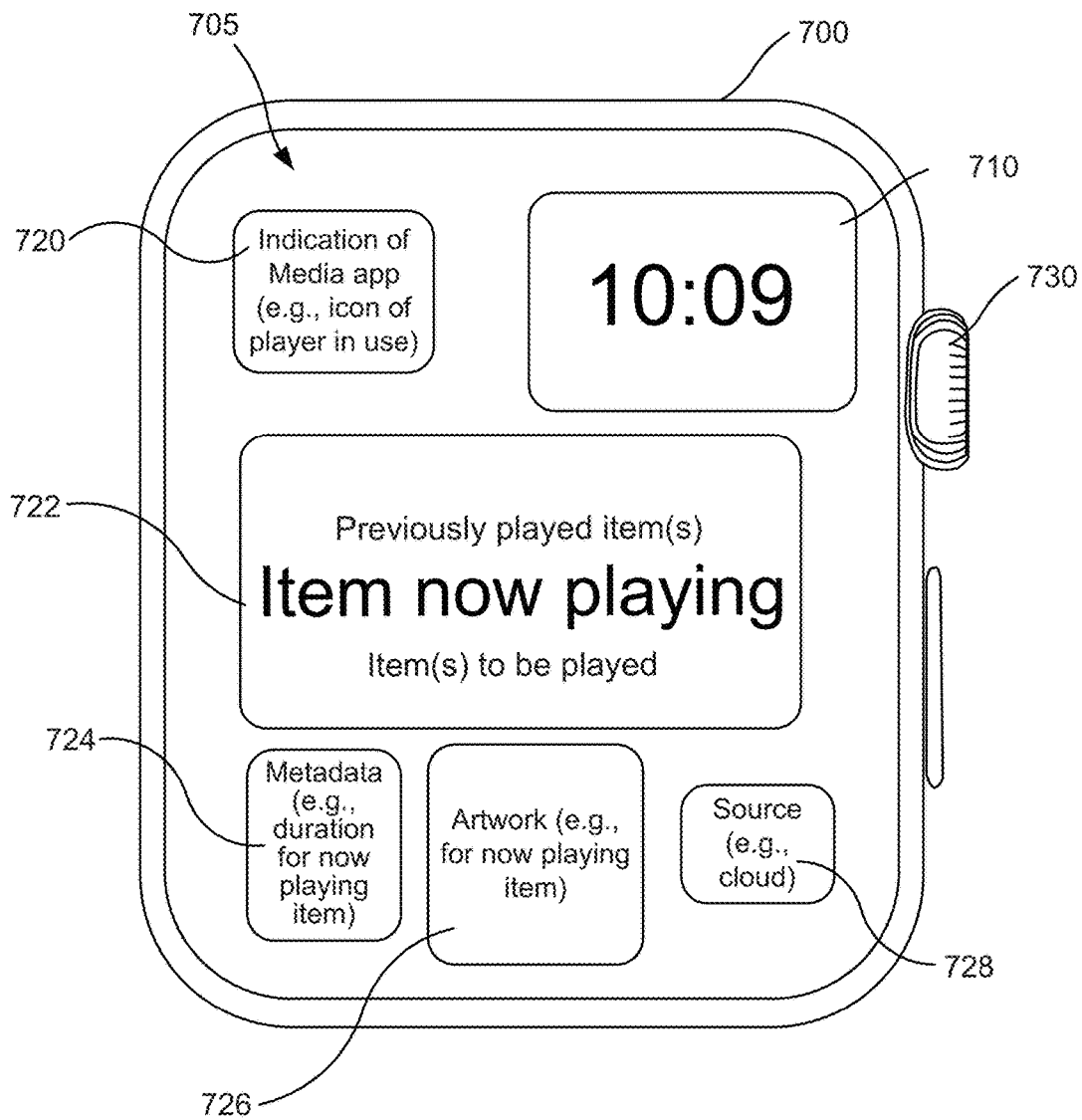
FIG. 7 shows an example interface for displaying media information on a smartwatch.

As discussed above with reference to FIG. 4, a client app on a companion smartphone (e.g., a watch proxy) can send media information about a range of media items to a wearable device (e.g., a smartwatch) for display on the wearable device. FIG. 7 shows a modular watch face 705 of a smartwatch 700 according to embodiments of the present invention. Modular watch face 705 includes a time window 710 and five style windows 720-728 for media information complications. Modular watch face 705 is shown with a particular layout of complications for displaying media item information. Different interface elements and style windows can be of different sizes and show different amounts of media information. For example, style window 722 can show more media information as it is larger than style windows 724-728. Thus, a user might want to configure style window 722 to show a complication corresponding to a media application that needs to show more than one piece of data, e.g., show information for more than one media item.

One or more display windows (which may correspond to a style window) of a watch face can overlap with each other such that a graphic from one display window can be overlaid on top of a graphic from another display window. For example, time window 710 can show time over a graphic (e.g., a position of the Earth or the sun) that corresponds to the current time.

In some embodiments, a user can enter a customize mode where a complication can be selected for displaying in a particular style window. Smartwatch 700 can include a digital crown 730 for selecting a complication to appear in a selected window. For example, requests from smartwatch 700 can be sent in response to movements of digital crown 730. In an embodiment, a time travel complication for a music playlist can be displayed on smartwatch 700 whereby if the user adjusts crown 730 to show future times, metadata for upcoming songs queued to be played at those future times is displayed. Similarly, if the user adjusts crown 730 to show past times, metadata for songs previously played at those past times is displayed on smartwatch 700.

In the example of FIG. 7, different style windows can have different templates for displaying different types of media information. A same style window can be used for more than one watch face. Different style windows can have different shapes and different aspect ratios as needed to display different portions of media information such as different metadata items or artwork. For instance, style window 720 can be used to display an indication of a media application in use. This can be an icon, logo, or other graphic to indicate a currently running media application (e.g., a musical note icon to indicate that the media application is a music player). Style window 722 can show media information for a requested range of a media queue. As shown, window 722 shows a previously played item, a current item, and a queued item to be played in the future. Window 724 may be used to show metadata for the current item (e.g., a rating, duration, or other metadata for the "now playing" item). Window 726 may be used to display other information for an item currently being played (e.g., album artwork for a "now playing" song). Window 728 can be used to indicate the source of a current item. For example, a cloud icon can indicate that the "now playing" song was retrieved from a cloud-based service as opposed to local storage on a companion device that smartwatch 700 is communicatively coupled with.

VII. Example Devices

Figure 8:
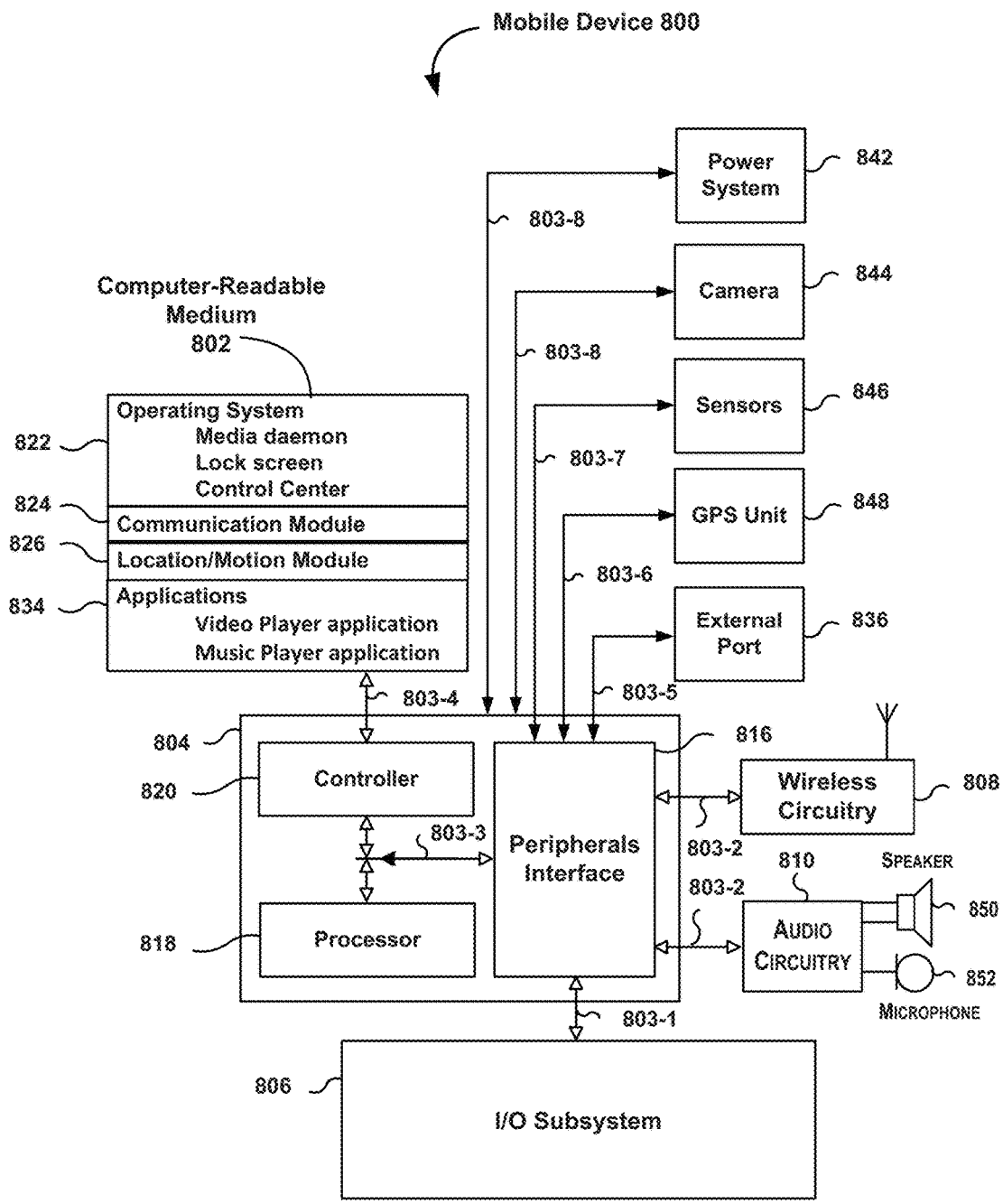
FIG. 8 is an example block diagram of an example mobile client device.
Figure 9:
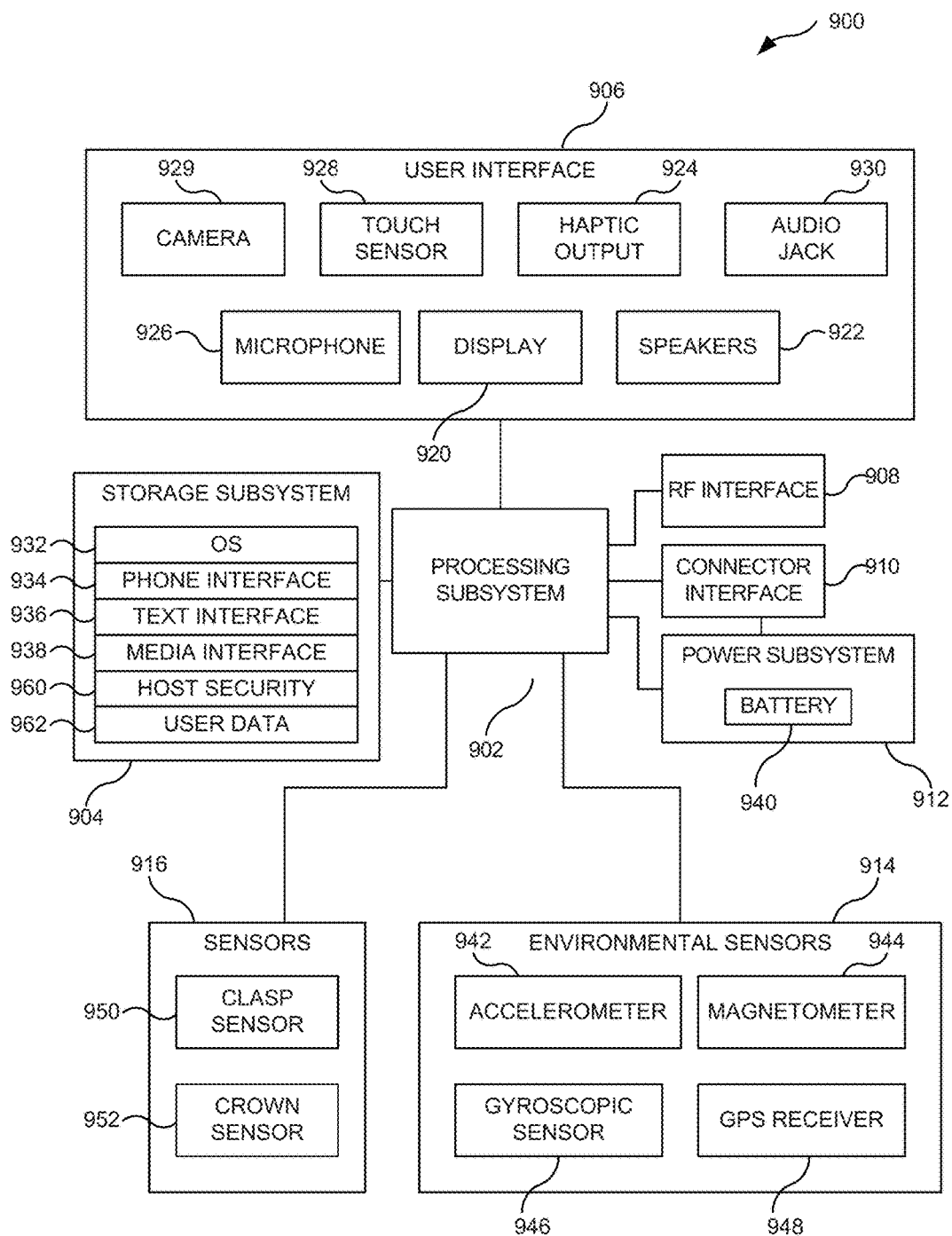
FIG. 9 is a simplified block diagram of an example wearable client device according to embodiments.

Embodiments described herein may take the form of, be incorporated in, or operate with a suitable electronic device, e.g., mobile companion devices or a watch device. One example of such a device is shown in FIG. 8 and takes the form of a mobile computing device. Another example of such a device is shown in FIG. 9 and takes the form of a wearable watch device. Alternative embodiments of suitable electronic devices include a mobile phone, a tablet computing device, a portable media player, and so on. Still other suitable electronic devices may include laptop/notebook computers, gaming consoles, personal digital assistants, touch screens, input-sensitive pads or surfaces, and so on.

FIG. 8 is an example block diagram showing a device that may be a host or companion device, a client device, or a server. Mobile device 800 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player device, personal digital assistant (PDA), a key fob, a car key, an access card, a multi-function device, a mobile phone, a portable gaming device, or the like, including a combination of two or more of these items. In various embodiments, a device hosting a media daemon, a device running a media application, a device running a client application, or any other device, server, access point, network element or other computing device or element may be implemented in whole or in part using the elements of FIG. 8.

It should be apparent that the architecture shown in FIG. 8 is only one example of an architecture for mobile device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices', conventional circuitry such as an antenna system, an RF transceiver, one or more amplifiers, a tuner, one or more oscillators, a digital signal processor, a CODEC chipset, memory, etc. In some embodiments, wireless circuitry 808 is capable of establishing and maintaining communications with other devices using one or more communication protocols. A mobile device can include wireless circuitry that can communicate over several different types of wireless networks depending on the range required for the communication.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802. Application programs 834 can include media applications such as the example video player application and a music player application shown in FIG. 8.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory, and secondary memory. The memory hierarchy can be implemented using any combination of RAM (e.g., SRAM, DRAM, SDRAM), ROM, FLASH, magnetic and/or optical storage devices, such as disk drives, magnetic tape, CDs (compact disks) and DVDs (digital video discs). In some embodiments, peripherals interface 816, one or more processors 818, and memory controller 820 can be implemented on a single chip, such as processing system 804. In some other embodiments, they can be implemented on separate chips.

Mobile device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 800 includes a camera 844. In some embodiments, mobile device 800 includes sensors 846. Sensors can include accelerometers, compasses, gyrometers, pressure sensors, audio sensors, light sensors, barometers, and the like. Sensors 846 can be used to sense location aspects, such as auditory or light signatures of a location.

In some embodiments, mobile device 800 can include a Global Positioning System (GPS) receiver, sometimes referred to as a GPS unit 848. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location/motion module (or set of instructions) 826, and other applications (or set of instructions) 834, such as a car locator app and a navigation app. In some examples, the other applications 834 may include applications that enable the functionality described above, namely the sharing of media information between a media application running on device 800 and other applications running on device 800, and/or other devices.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components. As shown, operating system 822 can include native software to implement a lock screen and Control Center functionality. In the example of FIG. 8, operating system 822 can also include a media daemon that runs as a background process on mobile device 800. In other embodiments, the media daemon is a media remote daemon that is a background process on mobile device 800, but is not part of operating system 822.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifiers) and motion (e.g., speed and bearing information) of mobile device 800. Modern positioning systems include satellite based positioning systems, such as GPS, cellular network positioning based on "cell IDs," and Wi-Fi positioning technology based on a Wi-Fi network. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position, speed, and/or bearing of the mobile device. In some embodiments, location/motion module 826 can determine a current location, speed, and/or bearing using Wi-Fi or cellular location technology. For example, the location, speed, and/or bearing of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 800 based at least in part on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on the mobile device can include any applications installed on the device 800, including without limitation, a browser, address book, contact list, email, instant messaging, word processing, keyboard emulation, data routing, a Control Center, widget, JAVA-enabled applications, encryption, digital rights management, voice recognition, voice replication, a video player application, and a music player application (which plays back recorded music stored in one or more files, such as MP3 or AAC files), etc. In the example of FIG. 8, applications 834 include a video player application and a music player application.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The timer module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user.

The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

FIG. 9 is a simplified block diagram of a device 900 (e.g., a wearable device such as a smartwatch) according to an embodiment of the present invention. Wearable device 900 can include processing subsystem 902, storage subsystem 904, user interface 906, RF interface 908, connector interface 910, power subsystem 912, environmental sensors 914, and strap sensors 916. Wearable device 900 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 904 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 904 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 904 can also store one or more application programs to be executed by processing subsystem 902 (e.g., video game programs, personal information management programs, media playback programs, interface programs associated with particular companion devices and/or companion device functionalities, etc.).

User interface 906 can include any combination of input and output devices. A user can operate input devices of user interface 906 to invoke the functionality of wearable device 900 and can view, hear, and/or otherwise experience output from wearable device 900 via output devices of user interface 906.

Examples of output devices include display 920, speakers 922, and haptic output generator 924. Display 920 can be implemented using compact display technologies, e.g., LCD (liquid crystal display), LED (light-emitting diode), OLED (organic light-emitting diode), or the like. In some embodiments, display 920 can incorporate a flexible display element or curved-glass display element, allowing wearable device 900 to conform to a desired shape. One or more speakers 922 can be provided using small-form-factor speaker technologies, including any technology capable of converting electronic signals into audible sound waves. In some embodiments, speakers 922 can be used to produce tones (e.g., beeping or ringing) and can but need not be capable of reproducing sounds such as speech or music with any particular degree of fidelity. Haptic output generator 924 can be, e.g., a device that converts electronic signals into vibrations; in some embodiments, the vibrations can be strong enough to be felt by a user wearing wearable device 900 but not so strong as to produce distinct sounds.

Wearable device 900 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 926, touch sensor 928, and camera 929. Microphone 926 can include any device that converts sound waves into electronic signals. In some embodiments, microphone 926 can be sufficiently sensitive to provide a representation of specific words spoken by a user; in other embodiments, microphone 926 can be usable to provide indications of general ambient sound levels without necessarily providing a high-quality electronic representation of specific sounds.

Touch sensor 928 can include, e.g., a capacitive sensor array with the ability to localize contacts to a particular point or region on the surface of the sensor and in some instances, the ability to distinguish multiple simultaneous contacts. In some embodiments, touch sensor 928 can be overlaid over display 920 to provide a touchscreen interface, and processing subsystem 902 can translate touch events (including taps and/or other gestures made with one or more contacts) into specific user inputs depending on what is currently displayed on display 920. In some embodiments, touch sensor 928 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 929 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 904 and/or transmitted by wearable device 900 to other devices for storage. Depending on implementation, the optical components can provide fixed focal distance or variable focal distance; in the latter case, autofocus can be provided. In some embodiments, camera 929 can be disposed along an edge of a face portion of wearable device 900 (not explicitly shown), e.g., the top edge, and oriented to allow a user to capture images of nearby objects in the environment such as a bar code or QR code. In other embodiments, camera 929 can be disposed on the front surface of a face member of wearable device 900 (not explicitly shown), e.g., to capture images of the user. Zero, one, or more cameras can be provided, depending on implementation.

In some embodiments, user interface 906 can provide output to and/or receive input from an auxiliary device such as a headset. For example, audio jack 930 can connect via an audio cable (e.g., a standard 2.5-mm or 3.5-mm audio cable) to an auxiliary device. Audio jack 930 can include input and/or output paths. Accordingly, audio jack 930 can provide audio to the auxiliary device and/or receive audio from the auxiliary device. In some embodiments, a wireless connection interface can be used to communicate with an auxiliary device.

Processing subsystem 902 can be implemented as any electronic device capable of processing, receiving, or transmitting data or instructions. Processing subsystem 902 can include one or more integrated circuits. For example, processing subsystem 902 may include one or more of: one or more single-core or multi-core microprocessors or microcontrollers, a central processing unit (CPU), an application-specific integrated circuit (ASIC), a digital signal processor (DSP), or additional combinations of such devices. In operation, processing subsystem 902 can control the operation of wearable device 900. In various embodiments, processing subsystem 902 can execute a variety of programs in response to program code and can maintain multiple concurrently executing programs or processes. At any given time, some or all of the program code to be executed can be resident in processing subsystem 902 and/or in storage media such as storage subsystem 904.

Through suitable programming, processing subsystem 902 can provide various functionality for wearable device 900. For example, in some embodiments, processing subsystem 902 can execute an operating system (OS) 932 and various applications for interfacing with a companion device, such as a phone-interface application 934, a text-interface application 936, and/or a media interface application 938. In some embodiments, some or all of these application programs can interact with a companion device, e.g., by generating messages to be sent to the host device and/or by receiving and interpreting messages from the companion device. In some embodiments, some or all of the application programs can operate locally to wearable device 900. For example, if wearable device 900 has a local media library stored in storage subsystem 904, media interface application 938 can provide a user interface to select and play locally stored media items. Examples of interface applications are described below.

In some embodiments, processing subsystem 902 can also execute a host security process 960 that provides support for establishing and maintaining a verified communication session with a companion or host device. A verified communication session can provide an enhanced level of security, and various operations of wearable device 900 and/or a host device can be made conditional on whether a verified communication session between the devices is in progress. For instance, host security process 960 can facilitate unlocking a host device when wearable device 900 is present, depending on whether a verified session is in progress. User data 962 can include any information specific to a user, such as identification information, user-specified settings and preferences, customized information (e.g., contacts, predefined text messages), and any other user-related data or content. In some embodiments, executing applications and processes can access user data 962 to facilitate operations.

RF (radio frequency) interface 908 can allow wearable device 900 to communicate wirelessly with various host devices. RF interface 908 can include RF transceiver components such as an antenna and supporting circuitry to enable data communication over a wireless medium, e.g., using Wi-Fi (IEEE 802.11 family standards), Bluetooth® (a family of standards promulgated by the Bluetooth® Special Interest Group, Inc.), Bluetooth® low energy, Apple Wireless Direct Link (AWDL), or other protocols for wireless data communication. RF interface 908 can be implemented using a combination of hardware (e.g., driver circuits, antennas, modulators/demodulators, encoders/decoders, and other analog and/or digital signal processing circuits) and software components. In some embodiments, RF interface 908 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 908. Wearable device 900 may wirelessly communicate with a sales terminal nearby, thus permitting a user to quickly and efficiently conduct a transaction such as selling, buying, or returning a good. Wearable device 900 may use NFC technology to perform these and other functions.

Connector interface 910 can allow wearable device 900 to communicate with various host devices via a wired communication path, e.g., using Universal Serial Bus (USB), universal asynchronous receiver/transmitter (UART), or other protocols for wired data communication. In some embodiments, connector interface 910 can provide a power port, allowing wearable device 900 to receive power, e.g., to charge an internal battery. For example, connector interface 910 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 910 and/or RF interface 908 can be used to support synchronization operations in which data is transferred from a host device to a wearable device 900 (or vice versa). For example, as described below, a user can customize certain information for wearable device 900 (e.g., a "favorite" contacts list and/or specific predefined text messages that can be sent). While user interface 906 can support data-entry operations, a user may find it more convenient to define customized information on a separate device (e.g., a tablet or smartphone) that has a larger interface (e.g., including a real or virtual alphanumeric keyboard), then transfer the customized information to wearable device 900 via a synchronization operation. Synchronization operations can also be used to load and/or update other types of data in storage subsystem 904, such as media items, application programs, and/or operating system programs. Synchronization operations can be performed in response to an explicit user request and/or automatically, e.g., when wireless device 900 resumes communication with a particular host device or in response to either device receiving an update to its copy of synchronized information.

Environmental sensors 914 can include various electronic, mechanical, electromechanical, optical, or other devices that provide information related to external conditions around wearable device 900. Sensors 914 in some embodiments can provide digital signals to processing subsystem 902, e.g., on a streaming basis or in response to polling by processing subsystem 902 as desired. Any type and combination of environmental sensors can be used; shown by way of example are accelerometer 942, a magnetometer 944, a gyroscope sensor 946, and a GPS receiver 948.

Some environmental sensors can provide information about the location and/or motion of wearable device 900. For example, accelerometer 942 can sense acceleration (relative to free fall) along one or more axes, e.g., using piezoelectric or other components in conjunction with associated electronics to produce a signal. Magnetometer 944 can sense an ambient magnetic field (e.g., Earth's magnetic field) and generate a corresponding electrical signal, which can be interpreted as a compass direction. Gyroscopic sensor 946 can sense rotational motion in one or more directions, e.g., using one or more MEMS (micro-electro-mechanical systems) gyroscopes and related control and sensing circuitry. Global Positioning System (GPS) receiver 948 can determine location based on signals received from GPS satellites.

Other sensors can also be included in addition to or instead of these examples. For example, a sound sensor can incorporate microphone 926 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 900 may modify a brightness of a display in response to the sensed ambient light. As another example, wearable device 900 may turn the display off if little or no light is sensed for a period of time.

Sensors 916 can include various electronic, mechanical, electromechanical, optical, or other devices that provide information to wearable device 900. For instance, clasp sensor 950 can be at least partially disposed within either or both of clasp members of wearable device 900 (not explicitly shown) and can detect when clasp members of wearable device 900 are engaged with each other or disengaged from each other. For example, engaging two opposing clasp members to each other can complete an electrical circuit, allowing current to flow through clasp sensor 950; and disengaging the clasp members from each other can break the circuit. As another example, one or more crown sensors 952 can be disposed to detect input from a crown of wearable device 900 (not explicitly shown). Crown sensors 952 can also include motion sensors, accelerometers, pressure sensors (e.g., piezoelectric devices), or the like.

Any other type of sensor can be used in addition to or instead of strap sensors 916 and crown sensors 952. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 900.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 900 may include a force sensor (not shown here) to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment, the force sensor may take the form of a gasket extending beneath the periphery of the display. The gasket may be segmented or unitary, depending on the embodiment.

Power subsystem 912 can provide power and power management capabilities for wearable device 900. For example, power subsystem 912 can include a battery 940 (e.g., a rechargeable battery) and associated circuitry to distribute power from battery 940 to other components of wearable device 900 that require electrical power. In some embodiments, power subsystem 912 can also include circuitry operable to charge battery 940, e.g., when connector interface 910 is connected to a power source. In some embodiments, power subsystem 912 can include a "wireless" charger, such as an inductive charger, to charge battery 940 without relying on connector interface 910. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 912 can also include other power sources, such as a solar cell, in addition to or instead of battery 940.

In some embodiments, power subsystem 912 can control power distribution to components within wearable device 900 to manage power consumption efficiently. For example, power subsystem 912 can automatically place device 900 into a "hibernation" state when strap sensors 916 indicate that device 900 is not being worn. The hibernation state can be designed to reduce power consumption; accordingly, user interface 906 (or components thereof), RF interface 908, connector interface 910, and/or environmental sensors 914 can be powered down (e.g., to a low-power state or turned off entirely), while strap sensors 916 are powered up (either continuously or at intervals) to detect when a user puts on wearable device 900. As another example, in some embodiments, while wearable device 900 is being worn, power subsystem 912 can turn display 920 and/or other components on or off depending on motion and/or orientation of wearable device 900 detected by environmental sensors 914. For instance, if wearable device 900 is designed to be worn on a user's wrist, power subsystem 912 can detect raising and rolling of a user's wrist, as is typically associated with looking at a wristwatch, based on information provided by accelerometer 942. In response to this detected motion, power subsystem 912 can automatically turn display 920 and/or touch sensor 928 on; similarly, power subsystem 912 can automatically turn display 920 and/or touch sensor 928 off in response to detecting that user's wrist has returned to a neutral position (e.g., hanging down).

Power subsystem 912 can also provide other power management capabilities, such as regulating power consumption of other components of wearable device 900 based on the source and amount of available power, monitoring stored power in battery 940, generating user alerts if the stored power drops below a minimum level, and so on.

In some embodiments, control functions of power subsystem 912 can be implemented using programmable or controllable circuits operating in response to control signals generated by processing subsystem 902 in response to program code executing thereon, or as a separate microprocessor or microcontroller.

It will be appreciated that wearable device 900 is illustrative and that variations and modifications are possible.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again, depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method comprising:
   receiving, at a media process from a first client application on a first device, a request for media information about a first range of media items in a playlist of a media application, the request being sent while the media application is executing on the first device, wherein the media information includes an order of media items and an identifier for each media item in the first range of media items, and wherein the media application is configured to play the first range of media items in the order specified in the media information,
   wherein the playlist includes a previous set of media items that have been played by the media application, a currently playing media item-, and a future set of media items that are to be played, and wherein the request specifies the first range to include the currently playing media item and at least one media item from one or more of the previous set of media items that have been played and the future set of media items that are to be played;

sending a request, by the media process to the media application, for the media information;

receiving, by the media process, at least a portion of media information from the media application, the received media information including the order of media items and the identifier for each media item in the first range of media items; and sending, by the media process, the media information received from the media application to the first client application for displaying information about the first range of media items being played by the media application.

2. The method of claim 1, wherein the media application is a music player application or a video player application, and wherein the media information includes metadata identifying, for each media item, one or more of a title, an artist, an album name, a duration, a publisher, a genre, and artwork.

3. The method of claim 1, wherein the first range of media items is a numeric range for a number of media items that have been played in the media application or a number of media items that are queued to be played in the media application.

4. The method of claim 1, wherein the first range of media items is a time range of media items that have been played in the media application within the time range or are queued to be played in the media application within the time range.

5. The method of claim 1, further comprising:
receiving, at the media process, from the media application, a changed order of the media items in the future set; and
sending the changed order to the first client application for displaying information about the future set.

6. The method of claim 1, further comprising:
receiving, at the media process, from the media application, changed media information for one or more media items in the first range of media items, the changed media information indicating a change to content of the one or more media items; and
sending the changed media information to the first client application for displaying the changed media information for the one or more media items.

7. The method of claim 1, further comprising:
receiving, at the media process, from the media application, updated media information indicating a change to the currently playing media item; and
sending the updated media information to the first client application for displaying information about the change to the currently playing media item.

8. The method of claim 1, further comprising:
receiving, at the media process, from a second client application on the first device, a request for media information about a second range of media items in the playlist of the media application, wherein the request specifies the second range to include the currently playing media item and at least one media item in the second range from one or more of the previous set and the future set;
sending a request from the media process to the media application;
receiving at least a portion of media information about the second range of media items at the media process from the media application, the received media information including the order of media items and the identifier for each media item in the first range of media items; and
sending the received media information to the second client application for displaying information about the second range of media items.

9. The method of claim 8, wherein the second client application is one of a control center or a lock screen of the device.

10. The method of claim 1, further comprising:
receiving, at the media process, a communication indicating that a new media application is executing on the device;
sending, from the media process to the new media application, a request for media information about a range of media items in a playlist of the new media application, wherein the playlist includes a previous set of media items that have been played by the new media application, a current media item, and a future set of media items that are to be played, and wherein the request specifies the range to include the current media item and at least one media item from one or more of the previous set and the future set;
receiving at least a portion of media information at the media process from the new media application, the received media information including an order of media items and an identifier for each media item in the range of media items; and
sending the received media information to the first client application for displaying information about the range of media items for the new media application.

11. A non-transitory computer readable storage medium having executable instructions stored thereon, that if executed by a processor of a computing device, cause the processor to perform operations, the operations comprising:
receiving, at a media process, from a first client application on a first client device, a request for media information about a first range of media items in a playlist of a media application, the request being sent while the media application is executing on the first client device, wherein the media information includes an order of media items and an identifier for each media item in the first range of media items, and wherein the media application is configured to play the first range of media items in the order specified in the media information, wherein the playlist includes a previous set of media items that have been played by the media application, a current media item, and a future set of media items that are to be played, and wherein the request specifies the first range to include the currently playing media item and at least one media item from one or more of the previous set of media items that have been played and the future set of media items that are to be played;
sending a request, by the media process to the media application, for the media information;
receiving, by the media process, at least a portion of media information from the media application, the received media information including the order of media items and the identifier for each media item in the first range of media items; and
sending, by the media process, the media information received from the media application to the first client application for displaying information about the first range of media items being played by the media application.

12. The computer readable storage medium of claim 11, wherein the instructions further comprise:
displaying, by the first client application, information about the range of media items on a display of the first client device.

13. The computer readable storage medium of claim 11, wherein the instructions further comprise:

receiving, at the media process, from a second client application on a second client device, the request for media information about the first range of media items in the playlist of the media application;

sending a request from the media process to the media application;

receiving at least a portion of media information at the media process from the media application, the received media information including the order of media items and the identifier for each media item in the first range of media items; and sending the received media information to the first client application for displaying information about the first range of media items.

14. The computer readable storage medium of claim 13, wherein the first client device is a smartphone and the second client device is a wearable device.

15. An electronic device comprising:
a processor;
a display; and
a memory having instructions stored thereon, that, if executed by the processor,
cause the processor to perform operations comprising:
sending, by a media process to a media application, a request for media information about a range of media items in a playlist of the media application, the request being sent while the media application is executing, wherein the media information includes an order of media items and an identifier for each media item in the range of media items, and wherein the media application is configured to play the range of media items in the order specified in the media information,
wherein the playlist includes a previous set of media items that have been played by the media application, a current media item, and a future set of media items that are to be played, and wherein the request specifies the range to include the currently playing media item and at least one media item from one or more of the previous set of media items that have been played and the future set of media items that are to be played;
receiving, by the media process, at least a portion of media information from the media application, the received media information including the order of media items and the identifier for each media item in the range of media items;
sending, by the media process, the media information received from the media application to a first client application;

receiving, by the client application, the media information; and displaying, by the client application, information about the range of media items being played by the media application on the display.

16. The device of claim 15, wherein the device is a wearable device, and wherein the information about the range of media items is displayed in a complication for displaying media information.

17. The device of claim 15, wherein the media application is a music player application or a video player application, and wherein the media information includes metadata identifying, for each media item, one or more of a title, an artist, an album name, a duration, a publisher, a genre, and artwork.

18. The device of claim 15, wherein the range of media items is a tunable numeric range N for a number of a last N media items that have been played in the media application or a next N media items that are queued to be played in the media application.

19. The device of claim 15, wherein the range of media items is a time range of media items that have been played in the media application within the time range or are queued to be played in the media application within the time range.

20. The device of claim 19, wherein the time range is a user-selected range of N minutes for a number of media items that have been played in the media application within a past N minutes or are queued to be played in the media application within a next N minutes.

21. The method according to claim 1, wherein is the media process is a media daemon that is on a second device.

22. The method according to claim 21, wherein the media process on the second device sends the received media information to the first client application on the first device in order to share the media information on the first client application on the first device with a second client application on the second device.

23. The method according to claim 1, wherein the first client application is one of a lock screen application, a control center application, a user interface application, or a proxy application.

24. The method according to claim 1, wherein the first client application is an application that is of a different type than the media application.

25. The method according to claim 1, wherein the first client application and the media application are stored on the first device.

* * * * *

UNITED STATES PATENT AND TRADEMARK OFFICE
CERTIFICATE OF CORRECTION

PATENT NO. : 10,447,748 B2  
APPLICATION NO. : 15/153641  
DATED : October 15, 2019  
INVENTOR(S) : Aurie Bendahan et al.

Page 1 of 1

It is certified that error appears in the above-identified patent and that said Letters Patent is hereby corrected as shown below:

On the Title Page

Item (57) Abstract, Line 7: delete "played The" and insert --played. The--.

In the Claims

Column 30, Line 61, Claim 1: delete "media item-," and insert --media item,--.

Signed and Sealed this  
Twenty-sixth Day of November, 2019

Andrei Iancu  
*Director of the United States Patent and Trademark Office*